Sept. 15, 1970

W. E. HAPPEL 3,528,202

ECCENTRICITY GAGE FOR MACHINE TOOLS

Filed May 12, 1967

INVENTOR
WILLIAM E. HAPPEL

BY
Mason, Porter, Diller & Brown
ATTORNEYS

Sept. 15, 1970     W. E. HAPPEL     3,528,202
ECCENTRICITY GAGE FOR MACHINE TOOLS
Filed May 12, 1967     3 Sheets-Sheet 2
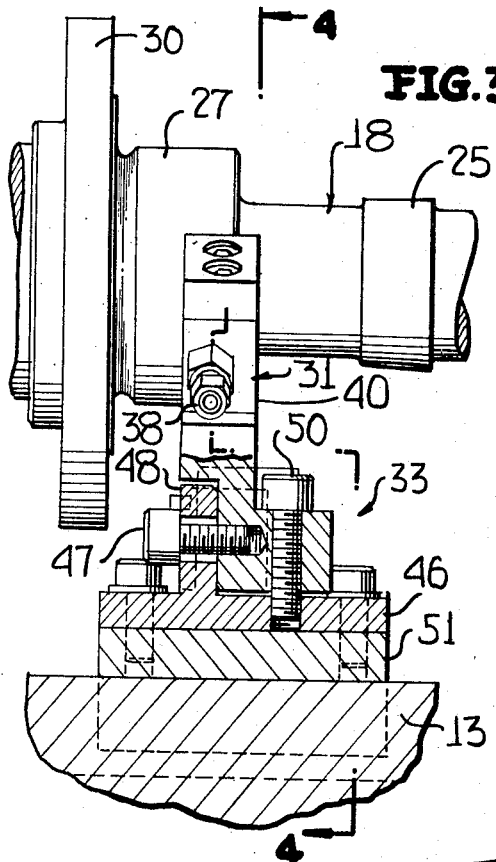
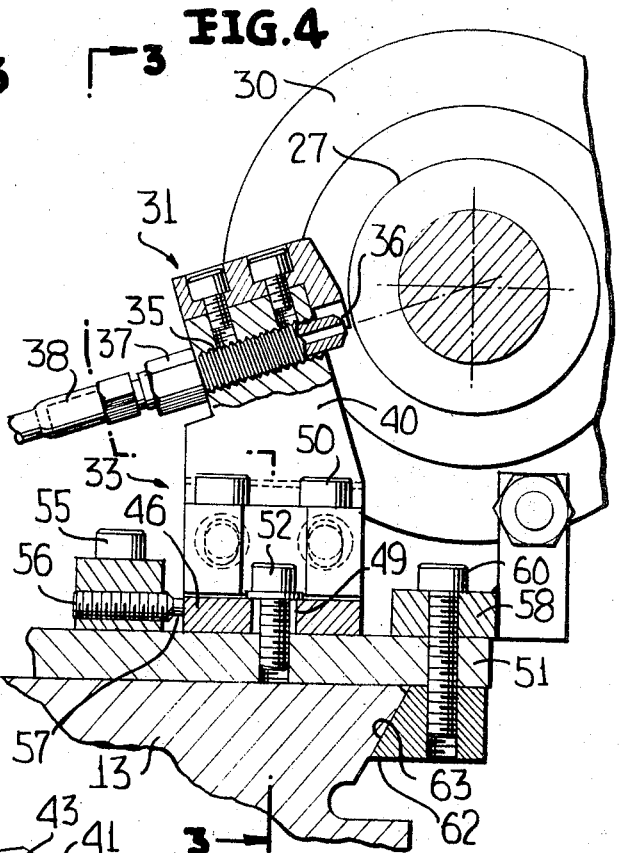
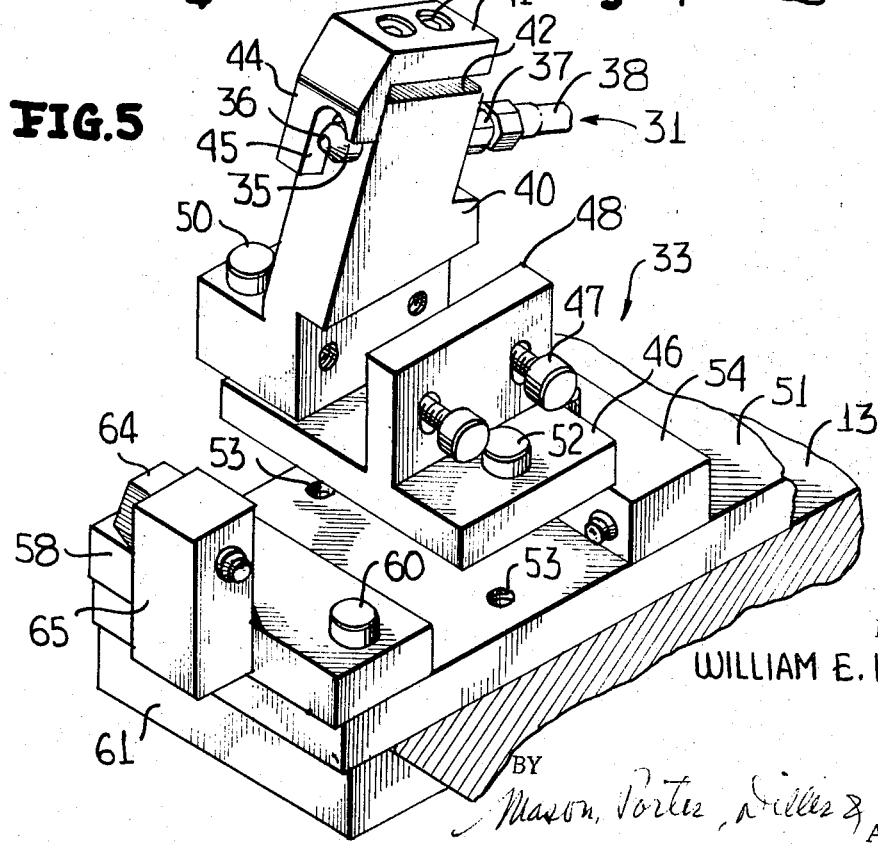
INVENTOR
WILLIAM E. HAPPEL
BY Mason, Porter, Diller & Brown
ATTORNEYS Sept. 15, 1970    W. E. HAPPEL    3,528,202
ECCENTRICITY GAGE FOR MACHINE TOOLS
Filed May 12, 1967    3 Sheets-Sheet 3

INVENTOR
WILLIAM E. HAPPEL

BY
Mason, Porter, Diller & Brown
ATTORNEYS

United States Patent Office 3,528,202
Patented Sept. 15, 1970

3,528,202
ECCENTRICITY GAGE FOR MACHINE TOOLS
William E. Happel, Waynesboro, Pa., assignor, by mesne assignments, to Litton Industries, Inc., a corporation of Delaware
Filed May 12, 1967, Ser. No. 638,143
Int. Cl. B24b *17/02, 49/08*
U.S. Cl. 51—165          16 Claims

ABSTRACT OF THE DISCLOSURE

This disclosure relates to a device for inspecting spaced portions of a workpiece mounted in a machine tool. A workpiece such as a camshaft or the like is placed in a machine tool, such as a grinding machine, between centers thereof. The workpiece is rotated such that gages at spaced portions of the workpiece may determine whether the condition of those portions is such as to permit an accurate machining operation, such as grinding cam contours. The gages are of the air jet type utilizing differences in resistance caused by size fluctuations in the workpiece portions to be measured to result in fluctuations at pressure switches. If the workpiece portions being gaged are within a specified tolerance range, the pressure switches will produce a signal in an electrical circuit to start a workpiece traverse movement, to place the workpiece in the first one of a series of predetermined grinding positions. In the event that any workpiece portion being gaged exceeds the specified tolerance range, no signal will be given by the pressure switches, and actuation of a grinding cycle will not be effected.

---

This invention relates to machine tools, and in particular to grinding machines which are adapted to handle the grinding of workpieces wherein accuracy of the workpiece bearing surfaces relative to its axis between center holes is of utmost importance as to size and eccentricity in order to achieve accurately ground workpiece surfaces, as for example, with automotive camshafts.

In grinding workpieces such as automotive camshafts, wherein the grinding of successive cams may be fully automatic, and the camshaft is placed on centers in a grinding machine, it becomes highly desirable to insure that the camshaft is supported axially and radially between centers. Additional radial support is provided by one or a plurality of steady rests, each of which engages one of the circular journal surfaces of the camshaft. However, the two end journals are not radially supported by rests. Should a camshaft not be checked in order to determine if its journals are within a permissible tolerance range, the various cams on the camshaft could be ground and the workpiece would later have to be rejected, thereby resulting in an unnecessary loss of machine time in grinding the cams on the camshaft. It is for this reason that it is highly desirable to determine whether or not camshaft journals conform to a permissible tolerance range, with respect to their eccentricity, prior to grinding the various cams. It is also desirable to provide a device whereby the inspection operation may be effected automatically, and whereby the eccentricity determination of the camshaft journals must be within the predetermined tolerance range in order to begin the camshaft traverse movement prior to initiating a grinding cycle.

Accordingly, it is an object of this invention to provide a means for inspecting a workpiece prior to starting a machine tool operation.

It is another object of this invention to provide a means for preventing the initiation of a machine tool operation if inspection of the workpiece indicates that previously machined portions are not within permissible tolerance limits.

It is a further object of this invention to provide, in a machine for grinding a workpiece with axially spaced portions, having a support for the workpiece, a means for effecting a relative movement of the workpiece and the grinding wheel, a gage mounted adjacent the workpiece portions to be inspected, and a means responsive to the gage for effecting relative movement between the workpiece and the grinding wheel.

It is another object of this invention to accomplish the above object, wherein the gage is operative through an electrical circuit for controlling a grinding cycle.

It is yet another object of this invention to provide a novel gage for determining if the eccentricity of previously machined portions of a workpiece is within a permissible range, wherein the gage comprises a jet adapted to expel a pressurized fluid therefrom against a surface portion being gaged, during the rotation of that portion, and wherein irregularities in the center holes of the workpiece or in the surface portion will vary the distance between the surface portion being gaged and the jet outlet, thereby varying the resistance afforded to the pressurized fluid by the surface being gaged, this fluid resistance being operative to control pressure switches which are set at acceptable and unacceptable limits, depending upon the tolerance for the workpiece portions.

With the above and other objects in view that will hereinafter appear, the nature of the invention will be more clearly understood by reference to the following detailed description, the appended claims and the several views illustrated in the accompanying drawings.

In the drawings:

FIG. 3 is an enlarged fragmentary front elevational view of a portion of the camshaft illustrated in FIG. 2, taken along the line 3—3 of FIG. 4, and wherein a journal and associated gage are illustrated, with gage mounting members being illustrated in section for clarity.

FIG. 4 is an enlarged fragmentary sectional view taken along the line 4—4 of FIG. 3, wherein the position of a gage, with respect to an associated journal is best illustrated.

FIG. 5 is an enlarged top perspective view, partially exploded, of a mounting means for the gage of this invention.

Figure 1:
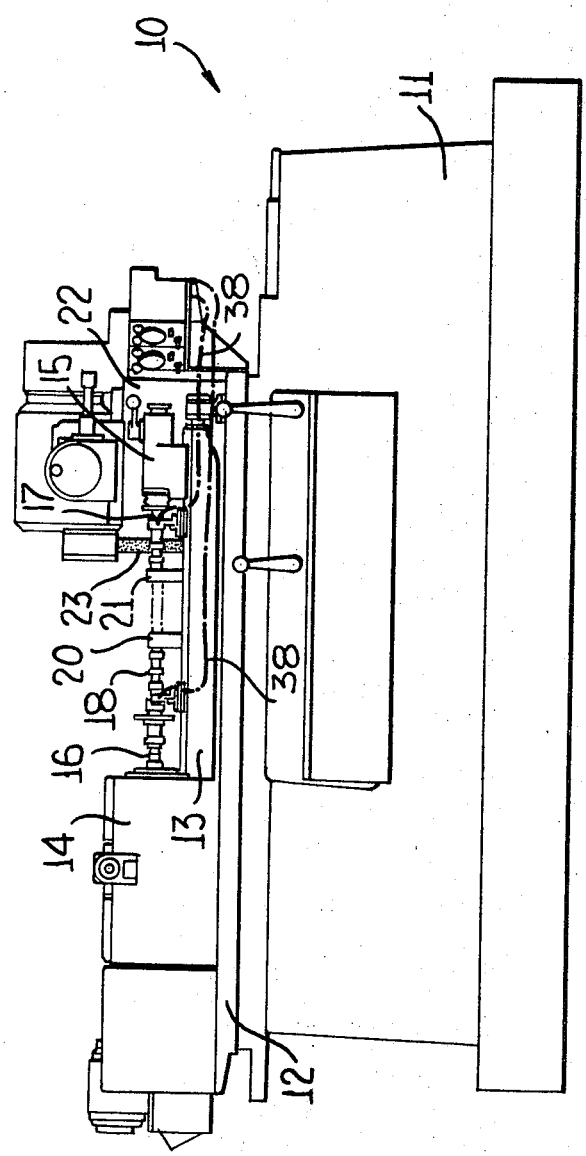
FIG. 1 is a front elevational view of an automatic cam grinding machine, with a camshaft carried between centers thereof, and which embodies the inspection device of this invention.

Referring now to the drawings in detail, reference is first made to FIG. 1, wherein there is illustrated a grinding machine, generally designated by the numeral 10, having a bed 11 and a carriage 12. A cradle 13 is supported on the carriage 12, for pivotal movement. A head stock 14 and a foot stock 15 are carried by the cradle 13. The head stock 14 has a head stock center 16 and the foot stock 15 has a foot stock center 17, between which is carried a camshaft 18, or other suitable workpiece. One or more camshaft supports 20 and 21 may be provided, spaced inwardly of the head stock center 16 and foot stock center 17, for supporting the camshaft 18.

A grinding wheel support 22 is carried by the bed 11, with a grinding wheel 23 rotatably carried on the support 22.

The carriage 12 is adapted for traverse, or longitudinal movement from the left end of the machine as viewed in FIG. 1, towards the right end thereof. The grinding wheel support 22 is adapted for forward or rearward movement on the machine bed 11, transverse to the direction of movement of the carriage 12.

The camshaft 18 comprises a major shaft portion 24 and a plurality of cam portions 25, the cam portions 25 being the portions of the camshaft 18 which are adapted to be ground by the grinding wheel 23. A pair of journals 27 and 28 are also provided, with at least one flange portion 30, also carried by the camshaft 18. The camshaft 18 is adapted to receive the head stock center 16 therein at one end, and the foot stock center 17 therein at the opposite end.

Figure 2:
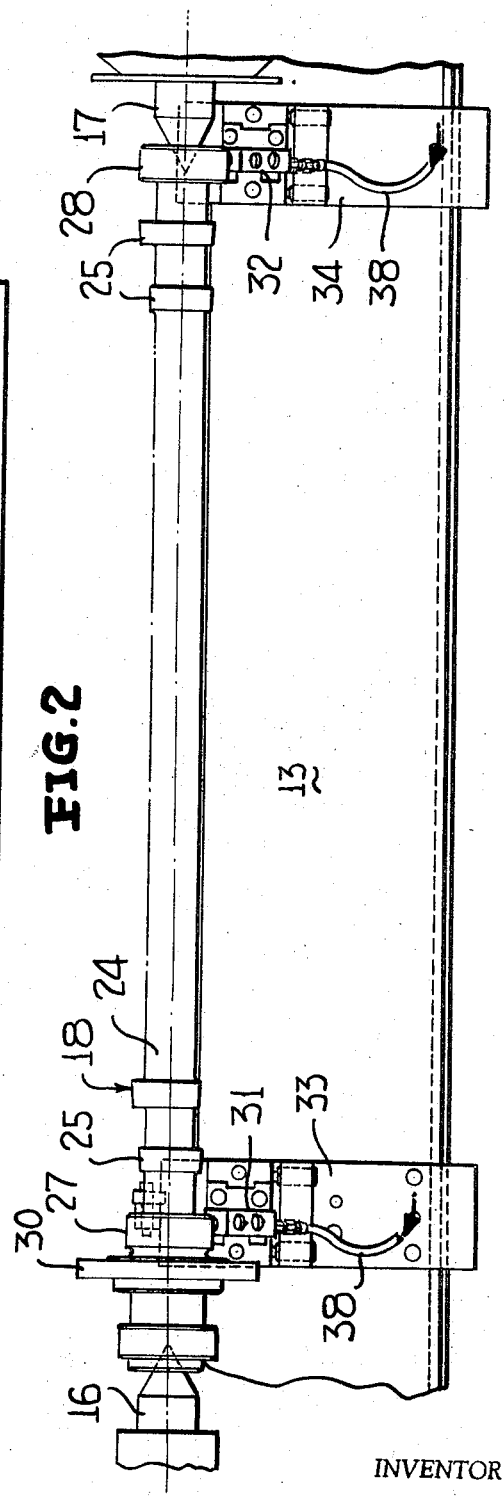
FIG. 2 is an enlarged plan view of an automotive camshaft supported on centers, and wherein an inspection device is illustrated at each end of the camshaft, in engagement with the journals thereof.

The camshaft 18 illustrated in FIG. 2 is adapted to be gaged at opposite ends by gages 31 and 32 respectively associated with journals 27 and 28.

The cradle 13 carries gage bracket assemblies 33 and 34, mounted thereon, which respectively, carry the gages 31 and 32.

Referring now to the illustrations of FIGS. 3 through 5, the gage 31 is shown to comprise an air jet member 35 having an outlet end 36 positioned a predetermined distance from the surface of the journal 27, and a connection end 37 to which is attached a hose 38 for delivering air under pressure to the jet member 35. The jet member 35 is threadably secured within and carried by a bracket member 40. A guard 41 is provided, secured to an upper end 42 of the bracket member 40 by suitable fasteners 43. A depending frontal wall portion 44 of the guard 41 is provided, having a slotted hole portion 45 partially enclosing the outlet end 36 of the jet member 35, with the outlet end 36 of the jet member 35 being partially recessed relative to the frontal wall portion 44 of the guard 41, as viewed in FIG. 5. The guard 41 is thus adapted to facilitate protection of the outlet end 36 of the jet member 35.

The bracket member 40 is clamped to a carrier plate 46 of the bracket assembly 33, by means of fasteners 47 connecting an upstanding plate portion 48 integral with carrier plate 46 to the bracket member 40, and by means of fasteners 50 connecting the bracket member 40 to the carrier plate 46.

The carrier plate 46 is secured to a support plate 51 by means of fasteners 52 extending through slotted holes 49 in the plate 46 and engaged within threaded holes 53 of the plate 51.

A carrier block 54 is secured to the plate 51 by fasteners 55, and the carrier block 54 is provided with transversely disposed threaded members 56, each having an abutment tip 57 for engaging a rearward surface of the plate 46. The threaded members 56 are adapted for co-operation with the slotted holes 49 in the plate 46 to facilitate close control of the selective positioning of the plate 46, and consequently of the gage 31, transversely of the axis of a journal 27, in order that the grinding machine 10 may handle camshafts having journals of various sizes.

A mounting block 58 is disposed on the plate 51, and secured thereto by fasteners 60 extending through the block 58 and the plate 51, and threadably engaged within a block 61 disposed beneath the plate 51, whereby the block 58 is securely clamped to the plate 51 and the plate 51 is clamped to the cradle 13 by engagement of the block 61 with the cradle 13 along cooperating sloped surfaces 62 and 63 of the cradle 13 and block 61, respectively.

An adjusting screw 64 is supported by a bracket 65 carried by the block 58, to protect the gage 31 in case of endwise movement of the flange 30 of the camshaft 18 towards the gage 31, as the camshaft 18 is removed from the machine 10.

Figure 6:
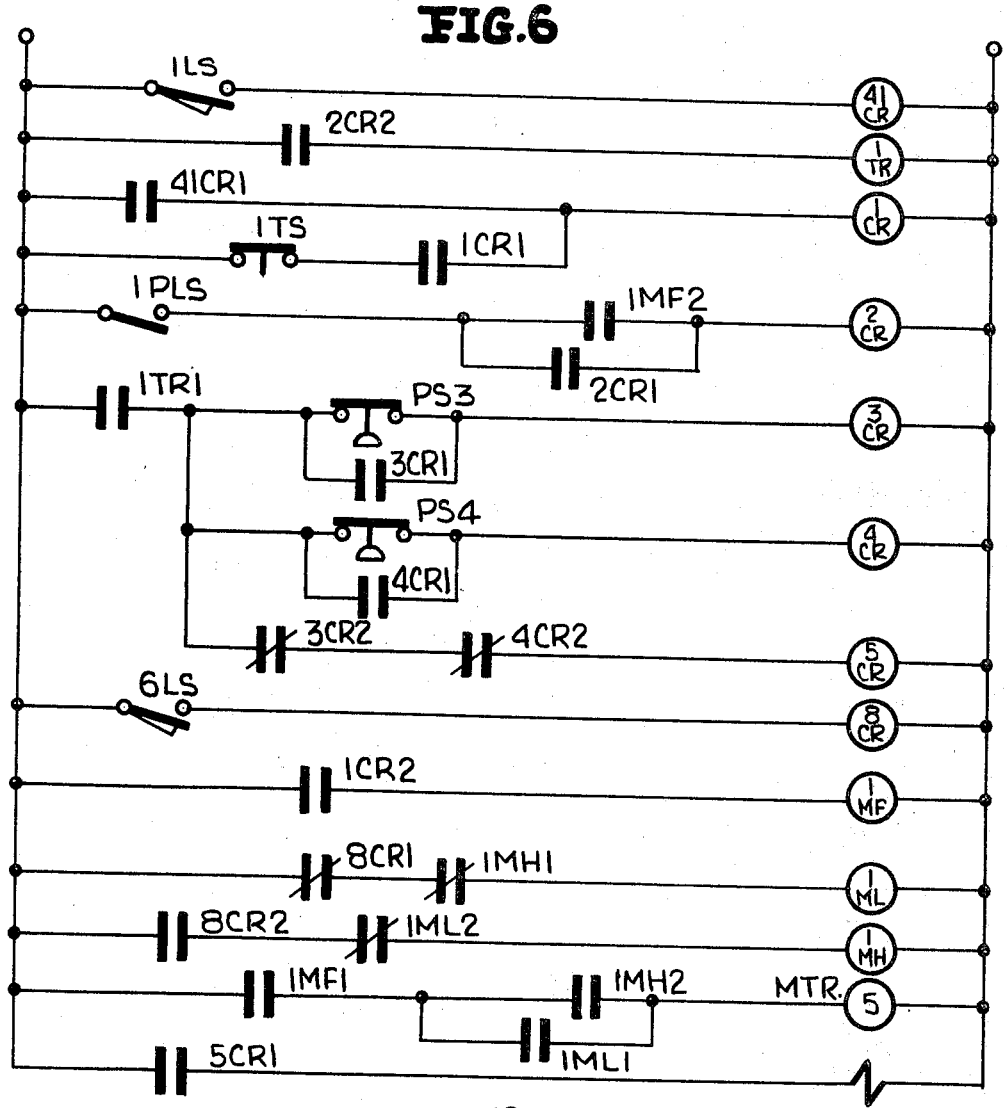
FIG. 6 is a schematic diagram for the electrical control circuitry of the machine of this invention.

A suitable air source (not shown) is provided, for delivering pressurized air to the jet member 35, via the hoses 38, but through pressure switches PS3 and PS4 respectively associated with the gages 31 and 32, with reference to FIG. 6.

Figure 7:
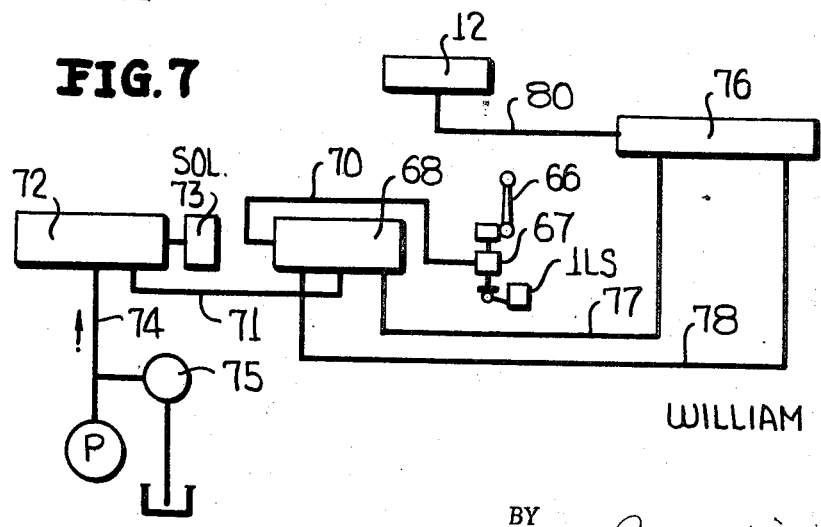
FIG. 7 is a schematic diagram of the hydraulic control means for the machine of this invention.

Referring now to FIG. 7, a starting lever 66 is provided, operative through a valve 67 to control a work head limit switch 1LS, also controlling the operation of a traverse valve 68, connected to the valve 67 by a pressure line 70. The valve 68 receives fluid pressure through a line 71 connected to a cycle blocking valve 72, which is actuated by a solenoid 73. Fluid pressure is provided to the cycle blocking valve 72 from a pressure source P, through a line 74. A manually controllable regulating valve 75 is provided at the pressure source P. Fluid from the traverse valve 68 is provided to opposite sides of a traverse cylinder 76 through lines 77 and 78, extending from the traverse valve 68 to opposite sides of a piston (not shown) in the traverse cylinder 76. Longitudinal movement of the piston of the traverse cylinder 76 provides corresponding longitudinal movement of the traverse carriage 12, through a linkage 80.

OPERATION

During the operation of the grinding machine 10, the traverse carriage 12 is movable longitudinally of the machine bed 11 due to pressure from a pressure source P being operative through the cycle blocking valve 72, when open, through the line 71, through the traverse valve 68, through one of the lines 77, 78, and through the traverse cylinder 76 to cause longitudinal movement of the piston (not shown) in the traverse cylinder 76, and consequent longitudinal movement of the carriage 12 through the linkage 80. Whichever line 77 or 78 is operative to provide sufficient pressure to move the piston in the traverse cylinder 76, the other of the lines 77 and 78 provides a fluid return from the low pressure side of the piston. Thus, the traverse carriage 12, being longitudinally movable, carries the camshaft 18 to selected positions, longitudinally of the machine, whereby cam portions 25 may be disposed opposite the grinding wheel 23. Other means, not shown nor described herein, permit a complete cycle of operation, whereby each of the cam portions 25 of the camshaft 18 is serially positioned for engagement by the grinding wheel 23 during a hesitation in the longitudinal movement of the camshaft 18, by transverse movement of the grinding wheel 23 relative to the camshaft 18. The grinding of the contours of the cam portions 25 by the grinding wheel 23 is effected by oscillating the cradle 13.

When either or both of the journals 27 and 28 do not conform to the acceptable tolerance limits of eccentricity and diameter, it is necessary to prevent longitudinal movement of the traverse carriage 12, in order that the cam portions 25 of the camshaft 18 will not be engaged by the grinding wheel 23. To this end, the pressure switches PS3 and PS4, operatively connected to the gages 31 and 32 respectively, are placed in circuit by actuation of the limit switch 1LS when the starting lever 66 is thrown, to place the circuitry of FIG. 6 into operation, in order that the solenoid 73 may be energized to permit the flow of fluid under pressure from the pressure source P, through the cycle blocking valve 72. If either of the journals 27 or 28 is not within the acceptable level, the corresponding pressure switch will remain closed and complete a circuit to energize relay 4CR, for example. Normally closed contact 4CR2 will be opened and relay 5CR will be deenergized. Contact 5CR1 will remain open, solenoid 73 will remain deenergized and valve 72 will remain in the right hand or cycle blocking position to prevent movement of carriage 12 to initiate a grinding cycle. This control device could be applied in the same manner to a wheel feed mechanism or other movable member of a machine tool to prevent or permit initiation or continuation of a grinding cycle.

When the lever 66 is thrown, the limit switch 1LS is closed, and a circuit is completed to energize the relay 41CR. A contact 41CR1 of the relay 41CR closes to complete a circuit to energize a relay 1CR.

A by-pass circuit around contact 41CR1 includes a tappet switch 1TS which serves to keep the relay 1CR energized until the camshaft 18 rotates to a predetermined angular position after contact 41CR1 opens at the end of a grinding operation. The contact 1CR2 then closes to energize a motor relay 1MF. A contact 1MF1 of the relay 1MF closes in the circuit of a work drive motor MTR5.

At the beginning of the cycle of operation, the cradle 13 is in the retracted position, in which position the limit switch 6LS is open in the circuit to a relay 8CR. A normally closed contact 8CR1 provides a circuit through a normally closed contact 1MH1 to energize a slow speed relay 1ML. A contact 1ML1 closes in the circuit between the contact 1MF1 and the motor MTR5 to energize the work drive motor MTR5, which causes the motor to initiate rotation of the camshaft 18 at a relatively slow speed.

This rotation of the motor MTR5 closes a plugging switch 1PLS to complete a circuit through a contact 1MF2 to energize a relay 2CR. The contact 2CR1 is a holding contact for the contact 1MF2. The contact 2CR2 closes to complete a circuit to energize a timer relay 1TR. During this initial slow rotation of the camshaft 18 by the motor MTR5, the gages 31 and 32 are operative, and if the journals 27 and 28 are both acceptable with respect to their eccentricity and diameter, the pressure switches PS3 and PS4, once opened, will remain open so that, after the predetermined length of time for which the timer relay 1TR is set has passed, and the contact 1TR1 closes after energizing, the relays 3CR and 4CR will remain deenergized, and a circuit will be completed through the contact 1TR1 and the normally closed contacts 3CR1 and 4CR1, to energize the relay 5CR. The contact 5CR1 of the relay 5CR will then complete a circuit to energize the solenoid 73 which is operative to open the cycle blocking valve 72 and permit the passage of fluid under pressure through the line 71 to the traverse valve 68, whereby the traverse cylinder 76 is operative to shift the carriage 12 to the left to its first grinding position, whereby a cam portion 25 of the camshaft 18 is positioned in alignment with the grinding wheel 23. In this position, the cradle 13 is rocked into position to effect a contact between a master cam and follower roller, such as that disclosed in U.S. Pat. No. 3,271,905 granted Sept. 13, 1966.

This movement of the cradle 13 closes the limit switch 6LS which completes a circuit to energize the relay 8CR.

The normally closed contact 8CR1 is opened by the energizing of the relay 8CR, to deenergize the slow speed relay 1ML. The contact 8CR2 is thus closed to complete a circuit through the normally closed contact 1ML2 to energize a high speed relay 1MH. A contact 1ML1 opens and contact 1MH2 closes in the circuit to the motor MTR5 to operate the motor and drive the camshaft 18 at a high speed during the grinding operation, with the grinding wheel 23 in engagement with the first cam portion 25 at the extreme right end of the camshaft 18, as viewed in FIG. 2.

Should either or both of the journals 27 and 28 be unacceptable, a pressure switch PS3 or PS4, or both, will remain closed. Thus, when a contact 1TR1 of the timer relay 1TR closes after the pre-set time period for the relay 1TR has passed, a circuit is completed to either or both of the pressure switches PS3 and PS4 to energize either or both of the relays 3CR and 4CR. The contact 3CR1 provides a holding circuit around the pressure switch PS3, as does the contact 4CR1 around the pressure switch PS4. Either or both of the normally closed contacts 3CR2 and 4CR2 are thus open in the circuit to the relay 5CR. Thus the relay 5CR is not energized, and the contact 5CR1 cannot be closed to permit the energizing of the solenoid 73. Thus, if either or both of the journals 27 and 28 is unacceptable, the solenoid 73 remains deenergized because it is held by contact 1CR1 and the cycle blocking valve 72 remains in position to block the passage of pressurized fluid to the traverse valve 68. Should this occur, the lever 66 is returned to inoperative position opening the limit switch 1LS and deenergizing the relay 41CR.

The contact 41CR1 thus opens in the circuit to the relay 1CR. The relay 1CR is not immediately deenergized because it is held by contact 1CR1 and the contact 1CR2 will remain closed in the circuit to the motor relay 1MF until the tappet switch 1TS opens when the camshaft 18 is in a predetermined angular position. When the tappet switch 1TS opens, it opens the circuit to the relay 1CR and the contact 1CR2 opens in the circuit to the motor relay 1MF. The contact 1MF1 of the relay 1MF then opens to deenergize the motor MTR5.

When the journals 27 or 28 are thus unacceptable, the cam grinding operation is never effected, and the camshaft 18 may be removed from the head stock and foot stock centers 16 and 17, respectively, and discarded or reworked, as desired. In removing the camshaft 18, the guard 41 and the adjusting screw 64 cooperate to prevent the camshaft 18 from accidentally striking the gage 31, either by longitudinal movement, in which case the flange 30 strikes the screw 64 adjusted as desired, or by the journal 27 striking the frontal portion 44 of the guard 41.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:
1. In a machine tool,
    (a) means for supporting a workpiece,
    (b) workpiece forming means,
    (c) controlled means for effecting relative movement of said supporting means and forming means, and
    (d) means for determining in advance of a forming operation whether at least one certain workpiece portion is within a given predetermined range as to dimension and shape, comprising
        (1) gage means mounted in a position for engaging said at least one workpiece portion, and
        (2) means responsive to said gage means for actuating said controlled effecting means upon receipt from said gage means of a signal indicating said at least one portion is within said given predetermined range.
2. The machine tool of claim 1 wherein said workpiece supporting means is adapted for rotation of a workpiece at its opposite ends and said determining means is adapted for operation upon relative rotation of said workpiece and said gage means.
3. The machine tool of claim 1 wherein said actuating means includes electrical circuitry.
4. The machine tool of claim 1 wherein determining means comprises a means for measuring eccentricity.
5. The machine tool of claim 2 wherein said gage means includes a fluid jet member spaced a predetermined distance from the desired axis of workpiece rotation and adapted when used in combination with rotating workpiece portions to provide a means for varying resistance to fluid from said jet member depending upon variations in spacing of workpiece peripheral portions from said jet member.
6. The machine tool of claim 5 wherein said actuating means comprises two pressure switches, each operatively connected to an associated jet member at opposite ends of the workpiece.
7. The machine tool of claim 1 wherein a mounting bracket means is provided for said gage means, said supporting means and said mounting bracket means being carried by a common cradle.

8. The machine tool of claim 1 wherein adjustable stop means are provided for preventing accidental endwise contact of said workpiece and gage means upon removal of the workpiece from its supporting means.

9. The machine tool of claim 1 wherein said effecting means includes a traverse carriage having a pivotally movable cradle thereon.

10. The machine tool of claim 1 wherein said controlled effecting means includes a traverse carriage with fluid pressure means for moving said carriage.

11. The machine tool of claim 10 wherein said actuating means includes electrical circuitry means for controlling said fluid pressure means.

12. The machine tool of claim 11 wherein said gage means comprises pneumatic means and said actuating means comprise pneumatic switch means for energizing said electrical circuitry means.

13. The machine tool of claim 1 wherein the machine tool is adapted for grinding a workpiece having axially spaced end portions,
  (a) wherein said supporting means comprises a bed having a workpiece support slidably mounted thereon for rotatably supporting the workpiece,
  (b) said forming means including a grinding wheel support slidably mounted on said bed, and a grinding wheel rotatably mounted on said grinding wheel support,
  (c) wherein the relative movement of the supporting means and forming means comprises transverse and longitudinal movements between said supports,
    (1) one of said movements being operative to effect initiation of a grinding cycle,
  (d) said responsive means comprising electrical circuit for controlling said movements and including means for rotating said workpiece, said circuit including a contact which completes said circuit only when the measurement of said at least one workpiece portion indicates that it is within the limits of the predetermined range.

14. The machine tool of claim 1 wherein the machine tool is adapted for grinding axially spaced cams on a camshaft,
  (a) wherein said supporting means comprises a bed having a workpiece support slidably mounted thereon for rotatably supporting the workpiece,
  (b) said forming means including a grinding wheel support slidably mounted on said bed, and a grinding wheel rotatably mounted on said grinding wheel support,
  (c) wherein the relative movement of the supporting means and forming means comprises transverse and longitudinal movements between said supports,
    (1) one of said movements being operative to effect initiation of a grinding cycle,
  (d) said camshaft having previously ground journals,
  (e) wherein said determining means comprises means for checking at least one journal for eccentricity and includes,
    (1) means for rotating said workpiece at an initially slow speed,
    (2) said gage means being eccentricity-responsive for preventing said grinding cycle initiation depending upon the degree of journal eccentricity.

15. The machine tool of claim 1 wherein the machine tool is adapted for grinding axially spaced cams on a camshaft,
  (a) wherein said supporting means comprises a bed having a workpiece support slidably mounted thereon for rotatably supporting the workpiece,
  (b) said forming means including a grinding wheel support slidably mounted on said bed, and a grinding wheel rotatably mounted on said grinding wheel support,
  (c) wherein the relative movement of the supporting means and forming means comprises transverse and longitudinal movements between said supports,
  (d) said camshaft having previously ground journals,
  (e) wherein said determining means comprises means for checking at least one journal for eccentricity and includes,
    (1) means for rotating said workpiece at an initially slow speed,
    (2) said gage means being responsive to excess eccentricity in at least one of said journals to prevent at least one of said relative movements.

16. The machine tool of claim 1 wherein the machine tool is adapted for grinding axially spaced cams on a camshaft,
  (a) wherein said supporting means comprises a bed having a workpiece support slidably mounted thereon for rotatably supporting the workpiece,
  (b) said forming means including a grinding wheel support slidably mounted on said bed, and a grinding wheel rotatably mounted on said grinding wheel support,
  (c) wherein the relative movement of the supporting means and forming means comprises transverse and longitudinal movements between said supports,
    (1) one of said movements being operative to effect initiation of a grinding cycle,
  (d) said camshaft having previously machined journals,
  (e) said response means comprising an electrical circuit for controlling said grinding cycle initiation,
  (f) wherein said determining means comprises means for checking at least one journal for eccentricity and includes,
    (1) means for rotating said workpiece at an initially slow speed,
    (2) a contact in said circuit which completes said circuit only when the measurement of said at least one journal indicates that it is within the limits of the predetermined range.

References Cited

UNITED STATES PATENTS

| | | | |
|---|---|---|---|
| 1,779,807 | 10/1930 | Einstein | 51—165 |
| 1,927,750 | 9/1933 | Mennesson | 51—165 |
| 1,993,854 | 3/1935 | Ott | 51—101 |
| 2,023,777 | 12/1935 | Balsiger | 51—165 |
| 2,243,410 | 5/1941 | Balsiger et al. | 51—101 |
| 2,639,562 | 5/1953 | Balsiger | 51—165 X |
| 3,097,454 | 7/1953 | Pheil | 51—165 |
| 3,271,910 | 9/1966 | Haisch | 51—165 |

LESTER M. SWINGLE, Primary Examiner

U.S. Cl. X.R.

51—101